March 2, 1965 F. W. WEBER 3,171,978

TIMING NETWORKS

Filed Sept. 18, 1961

INVENTOR.
FRANK W. WEBER
BY
Christie, Parker & Hale
ATTORNEYS.

3,171,978
TIMING NETWORKS
Frank W. Weber, Duarte, Calif., assignor to Burroughs Corporation, Detroit, Mich., a corporation of Michigan
Filed Sept. 18, 1961, Ser. No. 138,795
16 Claims. (Cl. 307—88.5)

The present invention is directed to improvements in electrical timing networks and, more particularly, to an improved electrical timing network employing a resistance-capacitance circuit for timing control.

Pulse generating circuits in which the pulse duration is controlled by a resistance-capacitance network are well known. For example, a monostable multivibrator type circuit or a blocking oscillator circuit are used to generate pulses of specific duration controlled by the time constant, i.e., the product of the resistance R and capacitance C of an R-C network. In this type of circuit an input trigger pulse initiates a discharge-recharge cycle for the capacitor. The output pulse duration is generally controlled by the discharge time of the capacitor through the resistance of the discharge circuit. Recovery or recharge time of the capacitor may be through a separate circuit of much smaller resistance and therefore be made much shorter than the discharge time. However, since the application of a trigger pulse to initiate an output pulse prior to the full recovery time of the capacitor results in an output pulse of a shortened time duration, the recovery time, no matter how short, imposes a distinct limitation on the periodicity with which pulses of a like predetermined time duration may be developed by the circuit. This, in turn, imposes an undesired limitation when it is desired to generate a train of pulse signals of predetermined time duration having a high repetition rate.

In view of the above, the present invention provides a timing network for developing a train of output pulses having a predetermined time duration, the periodicity of which is independent of the recovery time of the timing network. This permits a trigger pulse to be applied to the timing network immediately upon the termination of a preceding output pulse, thereby providing means for developing output pulses of equal time duration having a periodicity substantially greater than heretofore possible.

To accomplish this, the present invention, in a basic form, includes, in combination with a resistance-capacitance timing network, a voltage clamping device, such as a transistor or a zener diode and means for deriving an output signal from the voltage clamping device.

In brief, the timing circuit includes a normally open electronic input switch, a normally closed electronic control switch, a timing network including a capacitor coupled between the two switches and a biasing resistor coupled between the capacitor and a source of biasing potential. The voltage clamping device is coupled between a junction of the capacitor and the biasing resistor and a source of biasing potential whereby the voltage at which the clamping device becomes fully conductive limits the voltage on the capacitor to define when the capacitor is fully charged. The voltage at which the clamping device is fully conductive may be termed the "clamping voltage" of the device. In the case of the transistor, the clamping voltage may be the emitter to base potential when the transistor is in a saturated conducting state, while in the case of the zener diode, the clamping voltage may be the reverse breakdown voltage of the diode.

A trigger pulse applied to the timing network of the present invention closes the normally opened input switch, opens the normally closed control switch and drives the voltage clamping device into a nonconductive state to initiate an output pulse. While the input switch is closed and the control switch is open, the capacitor discharges from its fully charged state. When the capacitor is substantially discharged, the control switch again closes and the capacitor begins to recharge. At this time the input switch may again be opened either by a termination of the trigger pulse or a secession of a feedback signal applied to the input switch from the open control switch. In either case the capacitor recharges through the biasing resistor until the voltage across the voltage clamping device equals the clamping voltage. At this time the clamping device is fully conductive and the voltage on the capacitor clamped to define a fully charged condition. When the clamping device is fully conductive, the output pulse is terminated.

It this manner the time duration of the output pulse includes both the discharge and recovery time of the capacitor. Since the capacitor is fully charged at the termination of an output pulse, another trigger pulse may be immediately applied to the input switch to initiate another output pulse. Accordingly, the present invention provides means for generating a train of output pulses having a predetermined time duration and a repetition rate which is independent of the recovery time of the timing network.

The above, as well as other features of the present invention, may be more clearly understood by reference to the following detailed description when considered with the drawings, in which.

Figure 1:
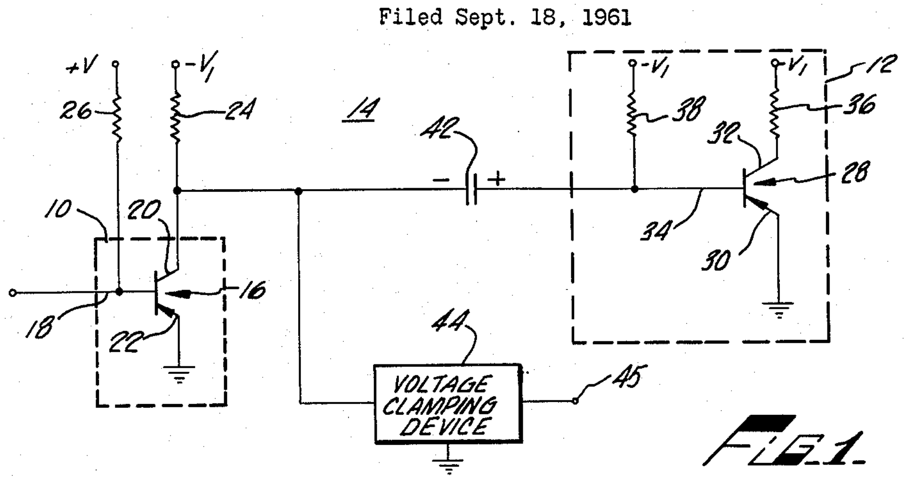
FIGURE 1 is a schematic-block diagram representation of the timing network of the present invention.

Referring to FIGURE 1, there is represented a basic form of the timing network of the present invention. Basically, the timing network includes a normally open input switch 10, a normally closed control switch 12 and a capacitor timing network 14 coupled therebetween. The input switch 10 is represented, by way of example, as including a PNP type transistor 16 having a base terminal 18, a collector terminal 20 and an emitter terminal 22. The transistor 16 is arranged in a grounded emitter configuration with the collector terminal 20 coupled to a source of biasing potential represented as $-V_1$ through a biasing resistor 24. The base terminal 18 is coupled to a source of positive potential represented as $+V$ through a biasing resistor 26. Due to the source of potential $+V$ the base terminal 18 is normally slightly positive relative to the emitter terminal 22. Thus, the transistor 16 is normally nonconducting. The transistor 16 is controlled by input signals applied to the base terminal 18. Thus, in response to a negative input signal, the transistor 16 is conductive while in response to a positive signal the transistor 16 is nonconductive.

The control switch 12 is represented as including, by way of example, a PNP type transistor 28. The transistor 28 includes an emitter terminal 30, a collector terminal 32, and a base terminal 34. The transistor 28 is arranged in a grounded emitter configuration and has its collector 32 coupled to a source of biasing potential represented as $-V_1$ through a biasing resistor 36. The base terminal 34 is coupled to the source of biasing potential $-V_1$ through a biasing resistor 38. Due to the source of potential $-V_1$, the base terminal 34 is normally maintained at a slightly negative potential relative to the emitter terminal 30. Thus, the transistor 24 is normally conducting—current flowing from the emitter 30 through the resistor 38 to the source of biasing potential $-V_1$.

The capacitor timing network 14 includes a capacitor 42 which is coupled between the base terminal 34 of the transistor 28 and the collector terminal 20 of the transistor 16.

To provide means for developing an accurately timed output signal, a voltage clamping device, represented in block diagram form as 44, is coupled between a junction of the capacitor 42 and the resistor 24 and ground. The clamping device includes an output terminal 45 from which is derived the desired output signal. The clamping device has a predetermined clamping voltage, that is the clamping device is actuated to be fully conductive when the voltage across the device equals a predetermined value. Thus, with the switch 10 open and the switch 12 closed, the capacitor 42 is charged from the source $-V_1$ through the resistor 24 and the emitter-base path of the transistor 28. The capacitor 42 charges until the voltage at the junction of the capacitor 42 and the resistor 24 reaches a value for which the voltage across the clamping device approximates the predetermined clamping voltage. The threshold device then becomes conductive, clamping the voltage at the junction of the capacitor 42 and the resistor 24 and limiting the voltage on the capacitor 42 to define a fully charged condition for the capacitor 42.

To initiate an output signal from the timing network, a negative input signal is applied to the base terminal 18 of the transistor 16, causing the transistor 16 to become conductive. The potential at the junction of the capacitor 42 and the resistor 24 then tends to rise toward ground, cutting off the clamping device 44 and initiating an output pulse at the output terminal 45.

The increase in potential at the junction of the capacitor 42 and the resistor 24 is also reflected across the capacitor 42 to base terminal 34 of the transistor 28, causing the transistor 28 to be cut off. The capacitor then discharges through the biasing resistor 38 until the potential at the base terminal 34 reaches the cut off level of the emitter-base junction of the transistor 28, at which time the transistor 28 again becomes conductive. If the negative input signal is then removed, the capacitor 42 begins to recharge. When the voltage across the clamping device 44 again equals the clamping voltage, the capacitor 42 is fully charged and the clamping device again becomes conductive, terminating the output signal at the output terminal 45.

Since the capacitor 42 is fully charged when the output signal developed at the output terminal 45 is terminated, another input signal may be immediately applied to the base terminal 18 to reinstitute another output signal immediately upon the termination of a preceding output signal. Thus, the present invention, utilizing the clamping device arrangement, provides means for developing a train of output pulses having any predetermined time duration and having a periodicity which is independent of the recovery time of the timing network.

Figure 2:
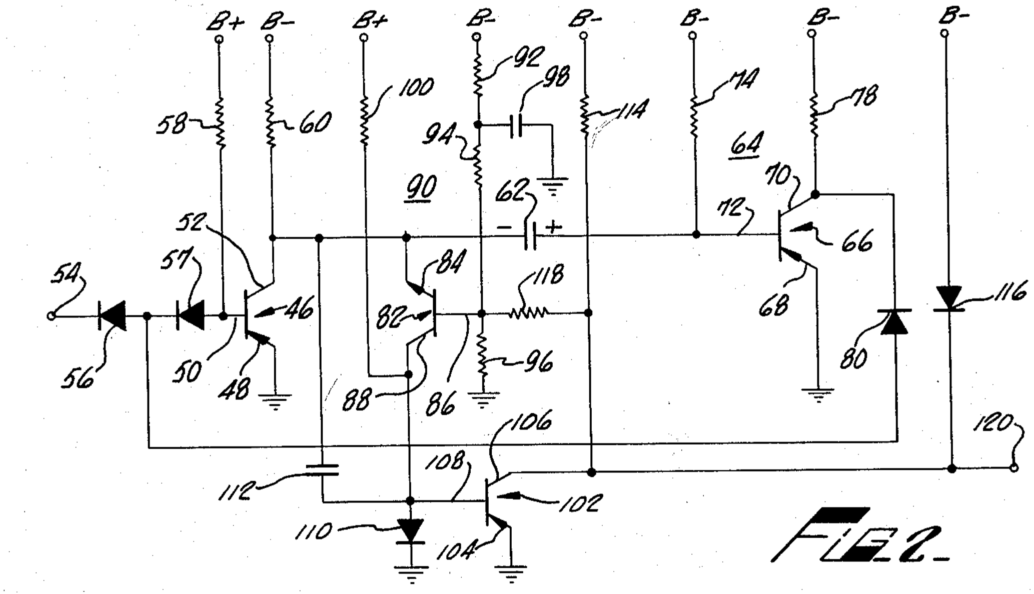
FIGURE 2 is a schematic representation of a preferred embodiment of the timing network of the present invention employing a transistor switch.

The timing network of the present invention is particularly adapted to use in multivibrators. A preferred embodiment of the present invention utilizing a transistor switch as the clamping device in a multivibrator setting is illustrated in FIGURE 2. The multivibrator includes an input transistor 46 having an emitter terminal 48, a base terminal 50 and a collector terminal 52. The transistor 46 is arranged in a grounded emitter configuration such that the base terminal 50 acts as an input terminal for the transistor 46, the base terminal 50 being coupled to an input terminal 54 by a pair of series connected diodes 56 and 57. The base terminal 50 is coupled to a source of positive potential, represented as B+, by a biasing resistor 58. Due to the source of biasing potential B+, the base terminal 50 is normally slightly positive relative to the emitter terminal 48. Thus, the transistor 46 is normally nonconductive and is driven into conduction by negative input signals applied to the input terminal 54.

The collector terminal 52 of the transistor 46 is coupled to a capacitor timing network. The capacitor timing network includes a biasing resistor 60 which is coupled between the collector terminal 52 and a source of biasing potential represented as B—. The capacitor timing network also includes a capacitor 62 which is coupled between the collector terminal 52 and a normally conducting control switch, represented generally at 64.

The control switch 64 includes a transistor 66 having an emitter terminal 68, a collector terminal 70 and a base terminal 72. The capacitor 62 is coupled to the base terminal 72. The transistor 66 is arranged in grounded emitter configuration. The base terminal 72 is also connected to a source of biasing potential B— through a biasing resistor 74. Due to the source of biasing potential B—, the potential at the base terminal 72 is normally slightly negative relative to the emitter terminal 68. Thus, the transistor 66 is normally conducting, current flowing from the base terminal 72 through the biasing resistor 74. The capacitor 62 charges up to the potential difference between the collector 52 of the nonconducting transistor 46 and the base terminal 72 of the conducting transistor 66.

The collector terminal 70 of the transistor 66 is coupled to the source of biasing potential B— through a biasing resistor 78 and to a junction of the diodes 56 and 57 at the base terminal 50 of the transistor 46 by a diode 80. The connection between the collector terminal 70 and the base terminal 50 provides a regenerative feedback path between the transistor 66 and the transistor 46, thereby completing the normal circuitry of a monostable multivibrator.

In accordance with the present invention, to provide means for developing a train of accurately timed output pulses, a voltage clamping device is coupled to a junction of the capacitor 62 and the biasing resistor 60. In the embodiment represented in FIGURE 2, the voltage clamping device includes an NPN type transistor 82 having an emitter terminal 84, a base terminal 86 and a collector terminal 88. The transistor 82 is characterized as having a predetermined base to emitter potential when in a saturated conductive state. This potential is generally of the order of 0.1 volt and may be considered as being the clamping voltage of the transistor 82.

By way of example only, the emitter terminal 84 is coupled to the capacitor 62 and the base terminal 86 is coupled to a voltage divider arrangement, represented generally at 90. The voltage divider arrangement includes the series connected resistors 92, 94 and 96. The resistor 92 is coupled to the source of biasing potential B— and the resistor 96 is coupled to ground. Thus, the potential at the base terminal 86 is determined by the voltage divider 90 and is positive relative to the source of biasing potential B—, the potential at the base terminal 86 being of a magnitude which is less than the magnitude of the source of biasing potential B—.

Coupled between a junction of the resistors 92 and 94 and ground is a capacitor 98. The capacitor 98 acts in combination with the voltage divider as an R-C filter, preventing sudden variations in the magnitude of the biasing potential B— from affecting the magnitude of the potential at the base terminal 86.

Since the potential at the base terminal 86 is positive relative to the biasing potential B—, the capacitor 62, in charging through the transistor 66, charges until the voltage at the junction of the capacitor 62 and the biasing resistor 60 becomes slightly negative relative to the potential at the base terminal 86. At this time the transistor 82 begins to conduct—base current beginning to flow in the base terminal 86. The potential at the junction of the capacitor 62 and the resistor 60 continues to go negative until the transistor 82 reaches its saturated conductive state. At this time the voltage at the junction of the capacitor 62 and the resistor 60 is clamped at a level determined by the potential at the base terminal 86 and the predetermined base to emitter potential of the transistor 82 in a saturated conductive state. With the junction of the capacitor 62 and the resistor 60 clamped, the capacitor is in its defined fully charged state.

The collector terminal 88 of the transistor 82 is coupled through a resistor 100 to a source of biasing potential represented as B+. The collector 88 is also coupled to a PNP type output transistor 102. The output transistor 102 includes an emitter terminal 104, a collector terminal 106 and a base terminal 108. The transistor 102 is coupled in a grounded emitter configuration and has its base terminal 108 coupled to the collector 88 of the transistor 82, to ground through a diode 110, and to a junction of the capacitor 62 and the biasing resistor 60 through a capacitor 112. The diode 110 operates to limit the positive potential applied to the base terminal 108 while the capacitor 112 operates in a manner hereinafter described to accelerate the cut off of the transistor 102.

When the transistor 82 becomes conductive to limit the voltage on the capacitor 62, the potential at the collector terminal 88 drops to a slightly negative value, causing the potential at the base terminal 108 of the transistor 102 to become negative. With a negative potential on the base terminal 108 of the transistor 102, the transistor 102 becomes conductive. Thus, the output transistor is so connected to the transistor 82 as to be conductive when the transistor 82 is conductive, and nonconductive when the transistor 82 is nonconductive.

The collector terminal 106 of the transistor 102 is coupled to the source of biasing potential B− separately through a resistor 114 and through a diode 116. The diode 116 operates to clamp the collector 106 at a negative potential determined by the forward resistance of the diode 116 and the value of the source of biasing potential B−.

Coupled between the collector 106 of the transistor 102 and the base 86 of the transistor 82 is a resistor 118. The resistor 118 acts as a regenerative feedback element between the transistor 102 and the transistor 82 to aid in cutting off the transistor 82 in response to the cut off of the transistor 102.

In view of the above, the monostable multivibrator represented in FIGURE 2, in its normal state, includes a normally nonconducting transistor 46, a normally conducting transistor 66, a normally conducting transistor switch 82, a normally conducting output transistor 102 and a normally charged capacitor 62.

To initiate an output signal from the monostable multivibrator, a negative input trigger pulse is applied to the input terminal 54. The trigger pulse causes the transistor 46 to become conductive. When the transistor 46 becomes conductive, the potential at the junction of the capacitor 62 and the biasing resistor 60 tends to rise towards ground. The increase in the potential at the junction of the capacitor and the biasing resistor 60 is reflected across the capacitor 62 to the base terminal 72 of the transistor 66, causing the transistor 66 to be cut off. When the transistor 66 becomes nonconductive the potential at the collector terminal 70 becomes more negative. The negative potential at the collector 70 is reflected through the regenerative feedback loop to the base of the transistor 46, holding the transistor 46 in a conductive state after the termination of the trigger pulse applied to the input terminal 54.

The rise in the potential at the junction of the capacitor 62 and the resistor 60 toward ground tends to cut off the transistor 82. The rise in potential is also reflected across the capacitor 112 to the base terminal 108 of the transistor 102, causing the transistor 102 to instantaneously become nonconductive. With the transistor 102 nonconductive, the potential at the collector terminal 106 becomes more negative. The change in potential at the collector 106 is reflected by the feedback resistor 118 to the base terminal 86 of the transistor 82, driving the transistor 82 into nonconduction. Thus, instantaneously after a negative trigger pulse is applied to the input terminal 54, the transistor 46 becomes conductive and the transistors 66, 82 and 102 become nonconductive. When the transistor 102 becomes nonconductive, a negative output pulse is initiated at an output terminal 120.

With the transistor 46 conducting and the transistor 66 nonconducting, the capacitor 62 discharges through the resistor 74 until the potential at the base terminal 72 reaches a level at which base current begins to flow, at which time the transistor 66 again becomes conductive. With the transistor 66 conductive, the potential at the collector terminal 70 rises towards ground. The change in potential at the collector terminal 70 is reflected through the regenerative feedback path to the base of the transistor 46, causing the transistor 46 to be cut off.

With the transistor 46 nonconducting and the transistor 66 conducting, the capacitor 62 is again charged by current flowing from the base terminal 72 through the biasing resistor 60. The capacitor 62 continues to charge until the potential at the emitter 84 is such that base current begins to flow in the transistor 82. The transistor 82 then becomes conductive, causing the output transistor to likewise become conductive, terminating the negative output signal developed at the output terminal 120.

Since the output signal is initiated when the transistors 82 and 102 become nonconductive and is terminated when the transistors 82 and 102 again become conductive, the time duration of the output signal is equal to the time required for the capacitor 62 to discharge and recharge to the voltage level determined by the value of the potential at the base of the transistor 82 and the base to emitter potential of the transistor 82 in a saturated conducting state. Further, since, at the termination of the output signal, the capacitor 62 is completely charged, another input signal may be immediately applied to the input terminal 54 to initiate another output signal immediately at the termination of the preceding output signal. Accordingly, a train of output signals may be developed having predetermined time duration and a periodicity which is independent of the recovery time of the capacitor timing network.

Figure 3:
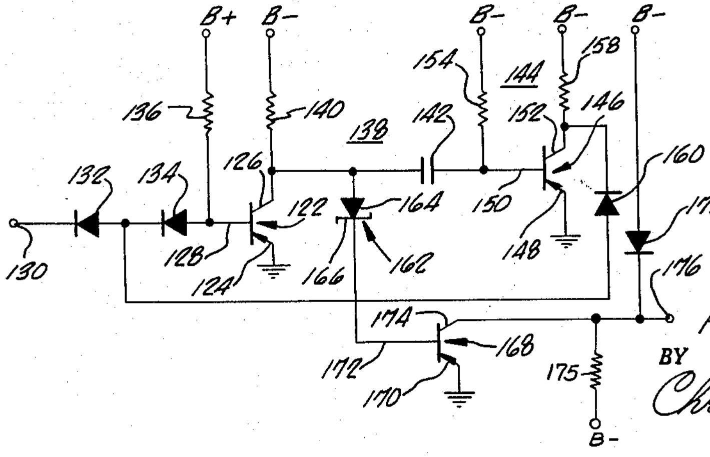
FIGURE 3 is a schematic representation of another preferred embodiment of the present invention utilizing a zener diode.

Referring to FIGURE 3, there is represented an embodiment of the timing circuit of the present invention employing a zener diode as a voltage clamping device in a multivibrator setting. The multivibrator includes an input transistor 122 having an emitter terminal 124, a collector terminal 126 and a base terminal 128. The transistor 122 is arranged in a grounded emitter configuration such that the base terminal 128 acts as an input for the transistor 122—the base terminal 128 being connected to an input terminal 130 through a pair of series connected diodes 132 and 134. The base terminal 128 is connected to a source of biasing potential represented as B+ through a biasing resistor 136. Due to the source of biasing potential B+, a positive potential is normally maintained on the base terminal 128 relative to the emitter 124. Thus, the transistor 122 is normally nonconducting and operates as a switch in response to negative input signals applied to the input terminal 130.

The collector terminal 126 of the transistor 122 is coupled to a capacitor timing network, represented generally at 138. The capacitor timing network includes a biasing resistor 140 is coupled between the collector 126 and a source of biasing potential represented as B−. The capacitor timing network also includes a capacitor 142 which is coupled between the collector 126 and a normally conducting transistor control switch represented generally at 144.

The transistor switch 144 includes a transistor 146 having an emitter terminal 148, a base terminal 150 and a collector terminal 152. The transistor 146 is arranged in a grounded emitter configuration. The capacitor 142 is coupled to the base terminal 150. The base terminal is also coupled to the source of biasing potential B— through a biasing resistor 154. Due to the source of biasing potential B—, a negative potential is normally maintained at the base terminal 150 relative to the emitter terminal 148. Accordingly, the transistor 146 is normally conducting—a current flowing from the base terminal 150 through the biasing resistor 154. The current flowing from the base terminal 150 also flows to the capacitor 142 to charge the capacitor through the biasing resistor 140.

The collector terminal 152 of the transistor 146 is coupled to a source of biasing potential B— through a biasing resistor 158 and to the base of the transistor 122 through a diode 160. The connection between the collector 152 and the base of the transistor 122 provides a regenerative feedback path, the transistor 146 and the transistor 122 thereby completing the circuitry for the usual monostable multivibrator.

In order to develop an accurately timed output signal in accordance with the present invention, a voltage clamping device in the form of a zener diode 162 is coupled between a junction of the capacitor 142 and the resistor 140 and a source of biasing potential. The zener diode 162 possesses a predetermined reverse breakdown voltage and has its anode 164 coupled to a junction of the capacitor 142 and the resistor 140. The cathode 166 of the zener diode 162 is coupled to an output transistor 168. The output transistor 168 includes an emitter terminal 170, a base terminal 172, and a collector 174 coupled to B— through a resistor 175. The transistor 168 is arranged in a grounded emitter configuration. The base terminal 172 is coupled to the cathode 166 of the zener diode 162. Thus, with the transistor 122 nonconducting and the transistor 146 conducting the capacitor 142 is charged from the transistor 146 through the biasing resistor 140 until the potential between the junction of the capacitor 142 and the resistor 140 and ground approximates the reverse breakdown voltage of the zener diode. When the potential between the junction of the capacitor 142 and the resistor 140 and the emitter-base junction of the transistor 168 reaches this magnitude, the zener diode 162 and the transistor 168 become conductive, clamping the voltage at the junction of the capacitor 142 and the resistor, thereby determining the voltage on the capacitor 142 to define its fully charged condition.

To initiate an output signal at an output terminal 176 which is coupled to the collector 174 of the transistor 168, a negative input trigger pulse is applied to the input terminal 130. The trigger pulse causes the input transistor 122 to become conductive. With the transistor 122 conductive, the potential at the collector terminal 126 ends to rise towards ground. The rise in potential at the collector terminal 126 is reflected across the capacitor 146 to the base terminal 150 of the transistor 146. causing the transistor 146 to be cut off. With the transistor 146 cut off, the potential at the collector terminal 152 becomes more negative. The change in potential at the collector 152 is reflected by the regenerative feedback path to the base of the transistor 122, maintaining the transistor 122 in a conductive state after the input signal applied at the input terminal 130 has terminated.

The rise in potential at the collector terminal 126 of the transistor 122 also causes the potential between the junction of the capacitor 142 and the resistor 150 and ground to be less than the reverse breakdown voltage of the zener diode 162. The zener diode 162 and the transistor 168 therefore become nonconductive. When the transistor 168 goes nonconductive, an output signal is initiated at the output terminal 176, the magnitude of which is determined by the magnitude of a source of biasing potential B— which is coupled to the output terminal 176 by a diode 178.

With the input transistor 122 conducting and the transistor 146 nonconducting, the capacitor 142 discharges through the resistor 154. The capacitor 142 continues to discharge until the potential at the base terminal 150 goes slightly negative, causing the transistor 146 to become conductive. With the transistor 146 conductive, the potential at the collector terminal 152 rises towards ground. The increase in potential at the collector 152 is reflected through the regenerative feedback path to the base of the transistor 124 causing the transistor 124 to become conductive.

With the transistor 122 nonconductive and the transistor 146 again conductive, the capacitor 142 is again charged to a voltage determined by the reverse breakdown voltage of the zener diode. When the voltage between the junction of the capacitor 142 and the resistor 140 and the emitter-base junction of the transistor 168 reaches a value substantially equal to the reverse breakdown voltage of the zener diode 162, the zener diode 162 and the transistor 168 again became conductive terminating the output signal at the output terminal 176.

Since the output signal is initiated when the zener diode 162 and output transistor 168 become nonconductive and is terminated when the zener diode 162 and the output transistor 168 again become conductive, the output signal has a time duration equal to the time required for the capacitor 142 to discharge and recharge to a voltage level determined by the zener diode. Also, since, at the termination of the output signal the capacitor 142 is fully charged, another input signal may be immediately applied to the input terminal 130 to initiate another output signal immediately upon the termination of a preceding output signal. Accordingly, a train of output signals having any predetermined time duration may be generated by the monostable multivibrator including the zener diode voltage clamping arrangement represented in FIGURE 3.

What is claimed is:

1. A timing network comprising: a capacitor; means including a resistor coupled to the capacitor for charging the capacitor; means for discharging the capacitor; a voltage clamping device having a predetermined clamping voltage coupled to a junction of the resistor and the capacitor and to a source of reference potential for switching to a conductive state during the charging of the capacitor when the voltage at the junction relative to the reference potential reaches the clamping voltage to remain in the conductive state while the junction voltage relative to the reference potential substantially equals the clamping voltage, thereby preventing any further build up of charge on the capacitor; and means for deriving an output signal from the clamping device.

2. A timing network comprising: a capacitor; means including a resistor coupled to the capacitor for charging the capacitor; means for discharging the capacitor; a transistor coupled to a junction of the resistor and the capacitor, the transistor having a nonconductive state and a saturated conductive state and being characterized as having a predetermined base to emitter potential when in its saturated conductive state; means for biasing the transistor to the saturated conductive state when the capacitor is charging, and a voltage is developed between the base and emitter of the transistor equal to the predetermined potential to limit any further build up of charge on the capacitor; and means for deriving an output signal from the transistor.

3. A timing network comprising: a capacitor; means including a resistor coupled to the capacitor for charging the capacitor; means for discharging the capacitor; a zener diode having an anode and a cathode and having a predetermined reverse breakdown voltage, the anode being coupled to a junction of the resistor and the capacitor; and means for deriving an output signal from the cathode of the zener diode.

4. A timing network comprising: a normally open input switch, the input switch being closed in response to an input signal; a normally closed control switch; means for momentarily opening the control switch in response to a closing of the input switch including a capacitor timing network having a capacitor coupled between the input switch and the control switch and a biasing resistor coupled between the capacitor and a source of biasing potential, the capacitor being charged from the closed control switch through the biasing resistor and discharged through the open control switch; a voltage clamping device having a predetermined clamping voltage coupled to a junction of the capacitor and the resistor and to a source of reference potential for switching to a conductive state during the charging of the capacitor when the voltage at the junction relative to the reference potential reaches the clamping voltage to remain in the conductive state while the junction voltage relative to the reference potential substantial equals the clamping voltage and to switch to a nonconductive state in response to a closing of the input switch; and means for deriving an output signal from the clamping device.

5. In a timing network which includes a normally open input switch, the input switch being closed in response to an input signal applied thereto, a normally closed control switch, the control switch opening and closing in response to a closing and opening of the input switch, a capacitor timing network including a capacitor coupled between the input switch and the control switch and a resistor coupled to the capacitor and to a source of biasing potential, the capacitor being charged from a closed control switch and discharged through an open control switch, apparatus for developing an output signal the timing of which is determined by the time required for the capacitor to discharge and fully recharge comprising a voltage clamping device having a predetermined clamping voltage coupled to a junction of the resistor and the capacitor and to a source of reference potential for switching to a conductive state during the charging of the capacitor when the voltage at the junction relative to the reference potential reaches the clamping voltage to remain in the conductive state while the junction voltage relative to the reference potential substantially equals the clamping voltage and to switch to a nonconductive state in response to a closing of the input switch and means for deriving an output signal from the clamping device.

6. A multivibrator comprising: a normally open input switch; means for closing the input switch in response to an input signal; a normally closed control switch; a capacitor coupled between the input switch and the control switch; a resistor coupled between the junction of the input switch and the capacitor and a source of biasing potential whereby the capacitor is normally charged from the closed control switch through the resistor; means for discharging the capacitor in response to a closing of the input switch; means for opening the control switch in response to a closing of the input switch and closing the control switch in response to a discharge of the capacitor; a regenerative feedback means coupled between the control switch and the input switch for maintaining the input switch closed while the control switch is open; a voltage clamping device having a predetermined clamping voltage coupled to a junction of the capacitor and the biasing resistor; means for biasing the clamping device to be normally conducting whereby the capacitor is charged to a voltage determined by the clamping voltage; means for cutting off the clamping device in response to a closing of the input switch, the clamping device becoming conducting only when the capacitor is charged; and output means coupled to the clamping device.

7. In a timing network including a normally open input switch, the input switch being closed in response to an input signal applied thereto, a normally closed control switch, means for opening the control switch in response to a closing of the input switch, a capacitor timing network including a capacitor coupled between the input switch and the control switch and a biasing resistor coupled between the capacitor and a source of biasing potential whereby the capacitor is charged from the closed control switch through the biasing resistor and discharged through the control switch when open, the combination of: a transistor coupled to a junction of the resistor and the capacitor, the transistor having a nonconductive state and a saturated conductive state and being characterized as having a predetermined base to emitter potential when in its saturated conducting state; means for biasing the transistor to the nonconductive state in response to a closing of the input switch and to the saturated conductive state only when the potential between the base and emitter of the transistor with the capacitor charging reaches a value equal to the predetermined potential, thereby limiting the charge on the capacitor; and means for deriving an output signal from the transistor.

8. The apparatus defined in claim 7 wherein the means for deriving an output signal from the transistor includes an output transistor of complementary type relative to the first mentioned transistor, and means for biasing the output transistor to be conductive when the first mentioned transistor is conductive and nonconductive when the first mentioned transistor is nonconductive.

9. The apparatus defined in claim 8 including means coupled between the input switch and the output transistor for immediately turning off the output transistor in response to a closing of the input switch.

10. The apparatus defined in claim 9 including a regenerative feedback means coupled between the output transistor and the first mentioned transistor for accelerating a turn off of the first mentioned transistor in response to a closing of the input switch.

11. A timing network comprising: a first transistor; means for biasing the first transistor to be normally nonconductive and conductive in response to input signals applied to the first transistor; a second transistor; means for biasing the second transistor to be normally conductive; a capacitor coupled between the first transistor and the second transistor; a biasing resistor coupled between the capacitor and a source of biasing potential; a third transistor coupled to a junction of the capacitor and the biasing resistor; means for biasing the third transistor to be normally conductive; and means for deriving an output signal from the third transistor.

12. A timing network comprising: a first transistor; means for biasing the first transistor to be normally nonconductive and conductive in response to input signals applied to the first transistor; a second transistor; means for biasing the second transistor to be normally conductive; a capacitor coupled between the first transistor and the second transistor; a biasing resistor coupled between the capacitor and a source of biasing potential; a third transistor coupled to a junction of the capacitor and the biasing resistor; means for biasing the third transistor to be normally conductive; a fourth transistor coupled to the third transistor; means for biasing the fourth transistor to be conductive when the third transistor is conductive and nonconductive when the third transistor is nonconductive; means coupled between the first transistor and the fourth transistor causing the fourth transistor to become nonconductive in response to an input signal applied to the first transistor; and regenerative feedback means coupled between the fourth transistor and the third transistor to turn off the third transistor in response to a turn off of the fourth transistor.

13. A multivibrator comprising: a normally open input switch; means for closing the input switch in response to an input signal; a normally closed control switch; a capacitor coupled between the input switch and the control switch; a resistor coupled between a junction of the input switch and the capacitor and a source of biasing potential whereby the capacitor is normally charged from the closed control switch through the biasing resistor; means for discharging the capacitor in response to a closing of the input switch; means for opening the control switch in response to a closing of the input switch and closing the control switch in response to a discharge of the capacitor; a regenerative feedback means coupled between the control switch and the input switch for maintaining the input switch closed while the control switch is open; a transistor coupled to a junction of the capacitor and the biasing resistor, the transistor having a nonconductive state and a saturated conductive state and being characterized as having a predetermined base to emitter potential when in the saturated conductive state; means for biasing the transistor to the nonconductive state in response to a closing of the input switch and to the saturated conductive state only when the potential between the base and emitter of the transistor, with the capacitor charging, reaches a value equal to the predetermined potential, thereby limiting the charge on the capacitor; and means for deriving an output signal from the transistor.

14. A multivibrator comprising: a first transistor; means for biasing the first transistor to be normally nonconductive and conductive in response to input signals applied to the first transistor; a second transistor; means for biasing the second transistor to be normally conductive; a first regenerative feedback means coupled between the second transistor and the first transistor; a first capacitor coupled between the first transistor and the second transistor; a biasing resistor coupled between the first capacitor and a first source of biasing potential; a third transistor coupled to a junction of the first capacitor and the biasing resistor; means for biasing the third transistor to be normally conductive; a fourth transistor coupled to the third transistor, the third and fourth transistor being of complementary type; means for biasing the fourth transistor to be conductive when the third transistor is conductive and nonconductive when the third transistor is nonconductive; a second capacitor coupled between a junction of the first capacitor and the biasing resistor and the fourth transistor for cutting off the fourth transistor in response to an input signal applied to the first transistor; and a second regenerative feedback network coupled between the fourth transistor and the third transistor to turn off the third transisor in response to a turn off of the fourth transistor.

15. In a timing network comprising a normally open input switch, means for closing the input switch in response to an input signal, a normally closed control switch, means for opening the control switch in response to a closing of the input switch, a capacitor timing network including a capacitor coupled between the input switch and the control switch and a biasing resistor coupled between the capacitor and a first source of biasing potential whereby the capacitor is charged from the closed control switch through the biasing resistor and discharged through the control switch when open, the combination of a zener diode having a predetermined reverse breakdown voltage and having its anode coupled to a junction of the capacitor and the biasing resistor and its cathode coupled to a second source of biasing potential which is positive relative to the first source of biasing potential whereby the capacitor charges to a voltage determined by the magnitude of the second source of biasing potential and the predetermined reverse breakdown voltage of the zener diode, and means for deriving an output signal from the zener diode.

16. A multivibrator comprising: a normally open input switch; means for closing the input switch in response to an input signal; a normally closed control switch; a capacitor coupled between the input switch and the control switch; a resistor coupled between a junction of the input switch and the capacitor and a source of biasing potential whereby the capacitor is normally charged from the closed control switch through the resistor; means for discharging the capacitor in response to a closing of the input switch; means for opening the control switch in response to a closing of the input switch and closing the control switch in response to a discharge of the capacitor; a regenerative feedback means coupled between the control switch and the input switch for maintaining the input switch closed while the control switch is open; a zener diode having a predetermined reverse breakdown voltage and having its anode coupled to the junction of the capacitor and the biasing resistor; means for biasing the zener diode to be forward biased in response to a closing of the input switch and reverse biased when the capacitor, in charging, reaches a value for which a voltage is developed across the zener diode equal to the reverse breakdown voltage, thereby limiting the charge on the capacitor; and means for deriving an output signal from the zener diode.

References Cited in the file of this patent

UNITED STATES PATENTS

| | | |
|---|---|---|
| 2,946,899 | Day | July 26, 1960 |
| 2,975,300 | Haugen et al. | Mar. 14, 1961 |
| 3,035,184 | Walker et al. | May 15, 1962 |